(No Model.)

F. O. LANDON.
SHAFT COUPLING.

No. 420,808. Patented Feb. 4, 1890.

Witnesses
Villette Anderson,
Philip C. Mase.

Inventor
F. O. Landon
By his Attorney
E. W. Anderson.

UNITED STATES PATENT OFFICE.

FREDERICK O. LANDON, OF BANTAM, CONNECTICUT.

SHAFT-COUPLING.

SPECIFICATION forming part of Letters Patent No. 420,808, dated February 4, 1890.

Application filed September 30, 1889. Serial No. 325,566. (No model.)

*To all whom it may concern:*

Be it known that I, FREDERICK O. LANDON, a citizen of the United States, and a resident of Bantam, in the county of Litchfield and State of Connecticut, have invented certain new and useful Improvements in Shaft-Couplings; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
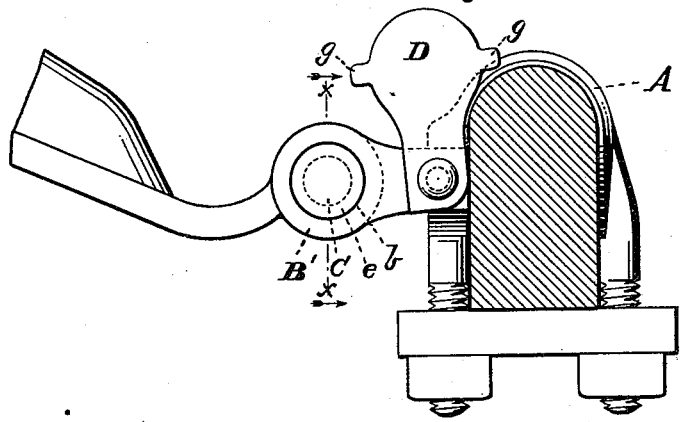
Figure 2:
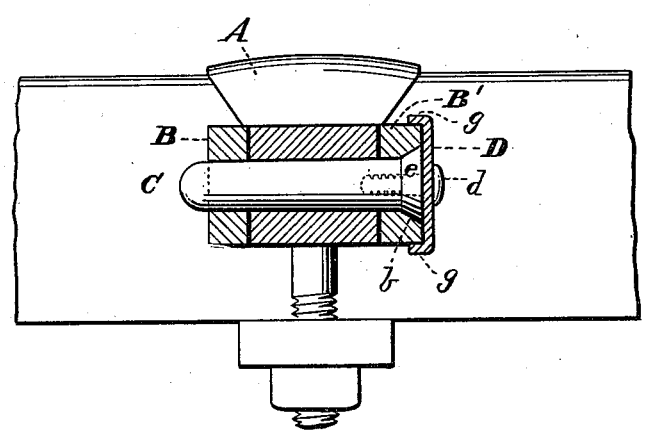

Figure 1 of the drawings is a representation of this invention and is a side view. Fig. 2 is a vertical section taken where the broken line $x\ x$ is marked on Fig. 1.

This invention relates to coupling devices for the shafts and poles of vehicles; and it consists in the novel construction and combination of parts, as hereinafter described, and pointed out in the claim.

The object of the invention is to provide a simple and effective coupling for a shaft or thill, whereby the latter may be readily coupled with the clip on an axle without necessitating the use of nut appliances, and may also be uncoupled by the proper manipulation of a pivoted gate or bar to prevent the escape of the coupling-pin after the connection of the parts is made.

In the accompanying drawings, the letter A designates the clip, which is secured to the fore axle in the usual manner, and having the forward-projecting shackle-arms B B' integral therewith, which are pierced laterally to form bearings for the thill-coupling pin C. The bevel-flanged head $e$ of the coupling-pin C is countersunk in the arm B', as shown, the bevel-bearing $b$ receiving it neatly, and the said pin is retained in position when the thill is coupled to the clip by a lateral gate D, pivoted to the rear portion of the arm B'. This gate or bar consists of a comparatively thin plate of malleable metal corresponding in general outline to the shape of the shackle-arm, and it is pivoted to swing vertically in the rear of the latter at $d$. The upper and lower edges of the gate B are provided with small lugs or ears $g$, which are designed to be hammered over and against the upper and lower edges of the adjacent arm of the clip, to prevent vertical displacement of the gate and to secure the latter over and against the head of the coupling-pin, and thereby prevent the escape of the latter from its engagement with the thill-iron and the shackle-arms. The head of the coupling-pin is countersunk flush with the outer side of the arm B', and the gate D, when closed against the head of the pin, is retained in close relation thereto and with the said arm by the engagement of the ears or lugs $g$ where bent over the upper and lower edges of the arm B', as stated.

The uncoupling of the thill may be rapidly effected by forcing one of the flexible ears from its engagement with the arm of the shackle.

What I claim, and desire to secure by Letters Patent, is—

In a thill or pole coupling, the combination, with the coupling-pin, having its head countersunk in one of the shackle-arms, of a clip, with a thill or pole iron, and a lateral pivoted gate or bar having flexible edge lugs or ears for securing the said gate in position against the head of the coupling-pin, substantially as shown, and for the purpose described.

In testimony whereof I affix my signature in presence of two witnesses.

FREDERICK O. LANDON.

Witnesses:
BUEL E. SEDGWICK,
MARY S. COE.